(12) United States Patent
Alberth, Jr. et al.

(10) Patent No.: US 8,374,574 B1
(45) Date of Patent: Feb. 12, 2013

(54) METHOD AND APPARATUS FOR STORING A MESSAGE FOR PLAYBACK DURING A USER-INITIATED EMERGENCY TELEPHONE CALL FROM A WIRELESS DEVICE

(75) Inventors: William P. Alberth, Jr., Crystal Lake, IL (US); Michael D. Kotzin, Buffalo Grove, IL (US); Rob Bero, Spring Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 3029 days.

(21) Appl. No.: 09/610,768

(22) Filed: Jul. 6, 2000

(51) Int. Cl.
*H04M 11/04* (2006.01)

(52) U.S. Cl. ............... 455/404.1; 455/404.2; 455/412.1; 455/412.2; 455/414.1; 455/414.2; 455/414.3; 379/33; 379/40; 379/41; 379/88.22; 379/88.23

(58) Field of Classification Search ............... 379/32.05, 379/33, 37, 38, 39, 40–42, 80–82, 88.04, 379/88.22, 88.23; 455/437, 439, 404, 407, 455/412, 404.1–2, 412.1–2, 414.1–4
See application file for complete search history.

(56) References Cited

U.S. PATENT DOCUMENTS

| | | | | | |
|---|---|---|---|---|---|
| 4,860,292 | A | * | 8/1989 | Newman et al. | 714/748 |
| 5,109,525 | A | * | 4/1992 | Nichols | 455/74 |
| 5,678,188 | A | * | 10/1997 | Hisamura | 455/509 |
| 5,742,666 | A | * | 4/1998 | Alpert | 455/404.2 |
| 5,923,731 | A | * | 7/1999 | McClure | 379/33 |
| 6,073,004 | A | * | 6/2000 | Balachandran | 455/404.2 |
| 6,173,169 | B1 | * | 1/2001 | Oh | 455/404 |
| 6,185,410 | B1 | * | 2/2001 | Greene | 455/100 |
| 6,212,260 | B1 | * | 4/2001 | Baum et al. | 379/38 |
| 6,275,690 | B1 | * | 8/2001 | Higuchi et al. | 455/412 |
| 6,487,542 | B2 | * | 11/2002 | Ebata et al. | 705/69 |
| 6,539,301 | B1 | * | 3/2003 | Shirk et al. | 701/200 |

FOREIGN PATENT DOCUMENTS

JP 08251313 * 9/1996

OTHER PUBLICATIONS

Advertisement in Jul. 10, 2000 Issue of *U.S. News & World Report* Magazine.

* cited by examiner

*Primary Examiner* — Tuan A Tran

(57) ABSTRACT

A wireless device such as a cellular phone is disclosed. The cellular phone is adapted to store a voice message picked-up by a microphone and store voice data representing the voice message in a memory. The cellular phone is further adapted to initiate a call such as an emergency 911 call in response to a turbo-dial or speed-dial key stroke initiated by the user. The cellular phone transmits the stored voice message, along with position data obtained by an onboard geolocation receiver, when the call is established.

27 Claims, 3 Drawing Sheets

METHOD AND APPARATUS FOR STORING A MESSAGE FOR PLAYBACK DURING A USER-INITIATED EMERGENCY TELEPHONE CALL FROM A WIRELESS DEVICE

The present invention relates to the telecommunication arts. It finds particular application in conjunction with a method and apparatus for storing an audio and/or data message for playback during a user-initiated emergency telephone call from a wireless device, and will be described with particular reference thereto.

BACKGROUND OF THE INVENTION

Many people have pre-existing medical conditions (e.g. heart conditions, severe Diabetes, etc.) that could predictably cause a wireless device (e.g. cellular phone) user to initiate an emergency telephone call (e.g. an emergency 911 call) at some unexpected point in time. Unfortunately, with such medical conditions, it is foreseeable that the user may become incapacitated either during or shortly after initiating the E911 call. If such an event were to occur, the cellular phone user would be unable to apprise the E911 operator of the exact nature of the emergency and of where the user is located.

Accordingly, it has been considered desirable to develop a new and improved method and apparatus for storing an audio and/or data message for playback during a user-initiated emergency telephone call from a wireless device that meets the above-stated needs and overcomes the foregoing difficulties and others while providing better and more advantageous results.

For instance, one advantage of the present invention is the provision of a method and apparatus that permits a user to record or upload a message into a wireless device, which message will be played back to an E911 operator in the event that the wireless device user is able to initiate an E911 call but is subsequently incapacitated.

Another advantage of the present invention is the provision of a wireless device that provides the ability to store an audio or data message (or messages) and to replay the stored message once an E911 telephone call has been established.

Yet another advantage of the present invention is the provision of a wireless device that permits a user to store a voice or data message (or messages) that would be sent when an emergency call (E911) is made.

Still another advantage of the present invention is the provision of a wireless device that stores voice signals (using voice annotation) or sounds made by the wireless device phone user after an emergency call is initiated.

A further advantage of the present invention is the provision of a wireless device that plays back a stored message across the uplink channel in response to a particular command (DTMF signal) sent across the downlink channel.

A still further advantage of the present invention is the provision of a wireless device that plays back a stored message across the uplink channel if a call is established and voice is not detected by the originating device within a predetermined time.

A still further advantage of the present invention is the provision of a wireless device that terminates playback of a stored message if the originating device detects voice activity on the uplink channel.

Yet another advantage of the present invention is the provision of a wireless device that reclaims and allocates used memory to voice annotation if an E911 event occurs.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE INVENTION

Figure 1:
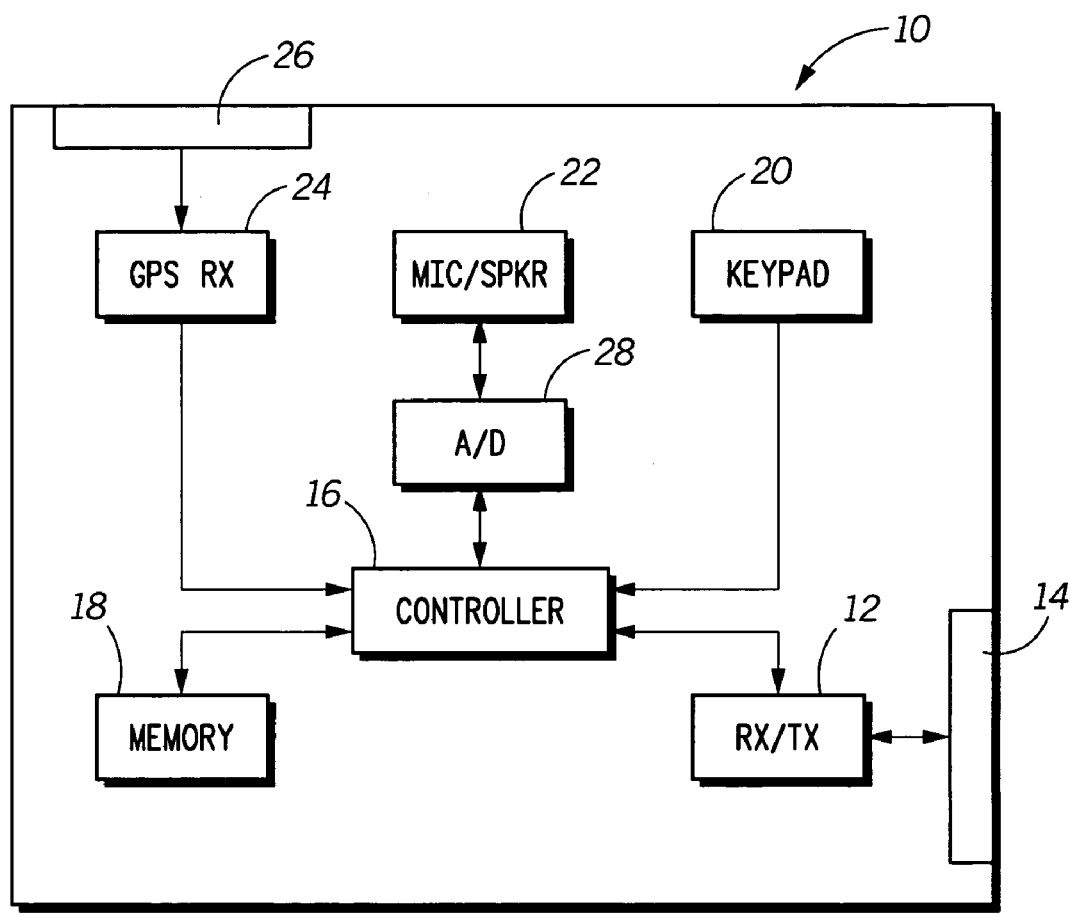
FIG. 1 is a simplified block diagram of an exemplary wireless device that incorporates the features of the present invention therein.

With reference now to FIG. 1, there is shown a simplified block diagram of an exemplary wireless or mobile device 10. The wireless device 10 can be a telephone, a cable telephony interface device, a cellular or PCS radiotelephone, a cordless radiotelephone, a radio, a personal digital assistant (PDA), a pager, a palm-top computer, a personal computer, etc. Accordingly, as used herein, wireless device refers to each of these devices and their equivalents.

The device 10 includes a transceiver 12, transceiver antenna 14, microprocessor-based controller 16, memory 18 (e.g. flash EEPROM), keypad 20, transducers 22 (e.g. microphone, speaker), geolocation receiver 24, and geolocation receiver antenna 26. The wireless device 10 is adapted to communicate (i.e. transmit and receive communication signals such as data and voice) over a public switched telephone network (PSTN) via a cellular radiotelephone system such as a code-division multiple access (CDMA) cellular radiotelephone system, time-division multiple access (TDMA) cellular radiotelephone system, global system for mobile communication (GSM) cellular radiotelephone system, etc.

A cellular radiotelephone system generally includes a switch controller coupled to a public switched telephone network (PSTN) and a plurality of base stations. Each of the plurality of base stations generally defines a geographic region proximate to the base station to produce coverage areas. One or more mobile stations (i.e. wireless devices) communicate with a base station that facilitates a call between the mobile station and the public switched telephone network.

The geolocation receiver 24 and antenna 26 provide the wireless device 10 with embedded GPS capability. GPS capability means the ability to self determine position through the use of the GPS constellation of satellites. The Global Positioning System (GPS) may be used to determine the position of a GPS receiver on or near the surface of the earth from signals received from a constellation of satellites. The orbits of the GPS satellites are arranged in multiple planes in order that signals can be received from at least four satellites at any position on earth. More typically, signals are received from six or eight satellites at most places on the earth's surface. Orbits of GPS satellites are determined with accuracy from fixed ground stations and are relayed to the spacecraft. The latitude, longitude, and altitude of any point close to the surface of the earth can be calculated from the times of propagation of the electromagnetic signals from four or more of the satellites.

A measured range, referred to as a "pseudorange", is determined between the GPS receiver and the satellites based upon these propagation times. The measured range is referred to as pseudorange because there is typically a time offset between timing clocks on the satellites and a clock within the GPS receiver. To determine a three dimensional position, at least four satellite signals are needed to solve for the four unknowns represented by the time offset and the three dimensional position. The nature of the signals transmitted from the GPS satellites is well known from the literature.

Each GPS satellite transmits two spread spectrum, L-band carrier signals, referred to as L1 and L2 signals. Two signals are needed if it is desired to eliminate any error that arises due to refraction of the transmitted signals by the ionosphere. The L1 signal from each GPS satellite is Binary Phase Shift Keyed (BPSK) modulated by two pseudorandom codes in phase quadrature. A pseudorandom code sequence is a series of numbers that are random in the sense that knowledge of which numbers have been already received does not provide assistance in predicting the next received number.

Using a binary pseudorandom code to modulate the phase of a carrier signal produces a suppressed carrier spread spectrum signal. The L2 signal from each satellite is BPSK modulated by only one of the pseudorandom codes. Use of the pseudorandom codes allows use of a plurality of GPS satellite signals for determining a receiver's position and for providing navigation information. A signal transmitted by a particular GPS satellite is selected by generating and matching, or correlating, the pseudorandom code for that particular satellite. Some of the pseudorandom codes are known and are generated or stored in GPS receivers. Other pseudorandom codes are not publicly known.

With continued reference to FIG. 1, a user of the wireless device 10 can prestore an emergency audio message in the memory 18 by depressing one or a sequence of keys associated with the keypad 20. Thereafter, an analog-to-digital (A/D) converter 28 samples and converts the analog audio signal from the microphone transducer 22 into binary data for input into the controller 16. As is known in the art, the controller 16 executes a Vocoder algorithm to compress the binary emergency message data prior to being stored in the memory 18. With the emergency message stored in memory 18, a look-up table is then updated to point to or otherwise link a dedicated or programmable turbo-dial key (i.e. E911 key) to the memory locations of the stored message.

Alternatively, it is contemplated that a dedicated Vocoder chip/circuit can be provided to compress the binary emergency message data prior to being stored in memory 18. For example, IS-95 (CDMA) uses a variable rate Vocoder that converts the acoustic signal from the microphone into an analog electrical signal. The electrical analog signal is then input into the encoder portion of the Vocoder, which produces a digital stream at a rate that varies frame-to-frame depending on the extent of voice content. The IS-95 Vocoder uses a 20 msec frame. All the bit rates produced by the variable rate Vocoder are reduced to as low a value as possible while still maintaining acceptable quality of the analog voice recovered at the base receiver. However, if the voice comes from the Public Switched Telephone Network (PSTN), then the voice spoken into the telephone mouth piece is converted into Pulse Code Modulation (PCM) digital form by PSTN equipment and forwarded to the IS-95 system in that form. The IS-95 system does not convert the PCM digital voice into analog form and then use a Vocoder to produce a digital Vocoder output because this procedure would cause too much distortion. Instead, the PCM digital form is converted directly into the Vocoder digital output format and made available to the base stations for transmission to the mobiles over the IS-95 common air interface. Calls from mobiles have their digital Vocoder bit streams converted directly to PCM format for transmission to destinations terminated in the PSTN.

Mobile-terminated calls use the decoder portion of the Vocoder to recover analog voice from the received Vocoder digital signals. The reason why the Vocoder is variable rate is to reflect the fact that different parts of conversations can be recovered at a receiver using different data rates. For instance, long vowels in the English language carry information that is particularly important for intelligibility. Spoken intervals containing such vowels would typically be transmitted at the highest data rate. When a speaker is silent during a call, a much lower data rate suffices and the data rate is selected to allow the receiver to quickly process the initial portions of the message when the user begins to speak. The lower data rates require lower transmitted power, which in CDMA allows higher capacity.

Figure 2:
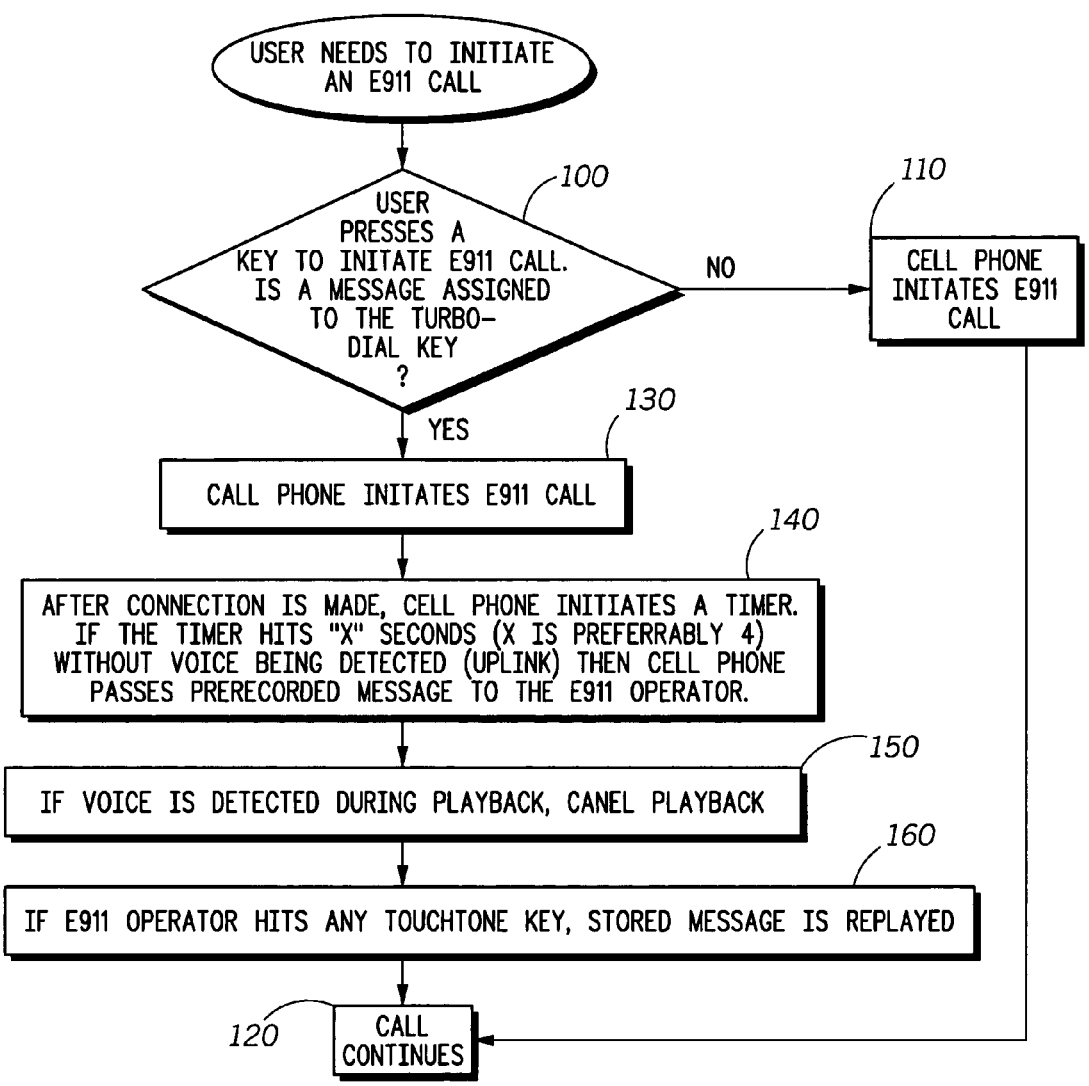
FIG. 2 is an operational flowchart for a first method of practicing the present invention.

With reference now to FIG. 2, a first routine for playing back, transmitting, or otherwise sending, etc. the prestored audio message during an emergency situation (e.g. the user develops incapacitating chest pains, or slips into insulin shock, or has a severe seizure, etc.) is shown. The emergency telephone call procedure is initiated by depressing a dedicated or conventionally pre-programmed turbo or speed-dial 911 key associated with the keypad 20, and thereafter, a look-up table or other data structure is checked to determine whether a prestored emergency audio message has been assigned to the depressed key (step 100).

If an audio message has not been assigned to the depressed key (i.e. no message has been prestored in memory 18), then the wireless device 10 initiates an E911 call in the same manner as a conventional speed-dialed call (step 110). That is, the controller 16 executes a routine that automatically dials a pre-stored telephone number (e.g. 911) that is assigned to the depressed key. Also, the controller 16 prompts the geolocation receiver 24 to resolve or otherwise lock on to received GPS signals to generate position data that is transmitted to the E911 call center across the uplink channel through transceiver 12. Thereafter, the emergency call proceeds in a conventional manner whereby a E911 operator answers the call and the user speaks directly to the operator, if possible, to convey the nature of the emergency (step 120).

If an audio message has been assigned to the depressed key (step 100), then the wireless device initiates an E911 call in the same manner as a conventional speed-dialed call (step 130). The controller 16 initiates a timer routine when the wireless device 10 detects an "off-hook" signal condition on the downlink channel (i.e. an E911 operator has answered the emergency call)(step 140). In the embodiment being described, the timer routine is set to time out after (x) seconds, where (x) is in the range of about two seconds to about six seconds and preferably about four seconds. While the timer routine is executing, the controller 16 samples the uplink channel to determine whether the user is presently speaking into the microphone 22. In particular, the controller 16 samples the voice detection section of a Vocoder chip/Vocoder algorithm to detect if the user's voice is presently being picked-up by the microphone 22.

If the timer routine times out without the user's voice (i.e. voice signal) being detected on the uplink channel (i.e. the user is incapacitated or is otherwise unable to speak), then the prestored emergency message is accessed from the memory 18 and transmitted across the uplink channel through the transceiver 12 under the direction of the controller 16. The controller 16 continues to sample the voice detection section of the Vocoder/Vocoder algorithm during transmission of the prestored emergency message across the uplink channel, and transmission of the prestored emergency message is canceled if the user's voice is detected (i.e. the user is now able to speak) (step 150).

Alternately, the transmission of the prestored emergency message across the uplink channel would be terminated if the user depressed any keys on the subscriber unit.

It is contemplated that the E911 mobile communication protocol will support the playback of the prestored emergency message by generating a DTMF signal across the downlink channel. Thus, if E911 operator desires to have the prestored emergency message replayed, the E911 operator simply needs to depress any one of the operator's keypad keys to generate the DTMF signal on the down link (step 160). Thereafter, when the wireless device 10 detects the DTMF signal, the prestored emergency message is played back through the transceiver 12 under the direction of the controller 16. Otherwise, once the prestored emergency message and the position information are transmitted to the E911 call center, the emergency call proceeds (step 120).

Figure 3:
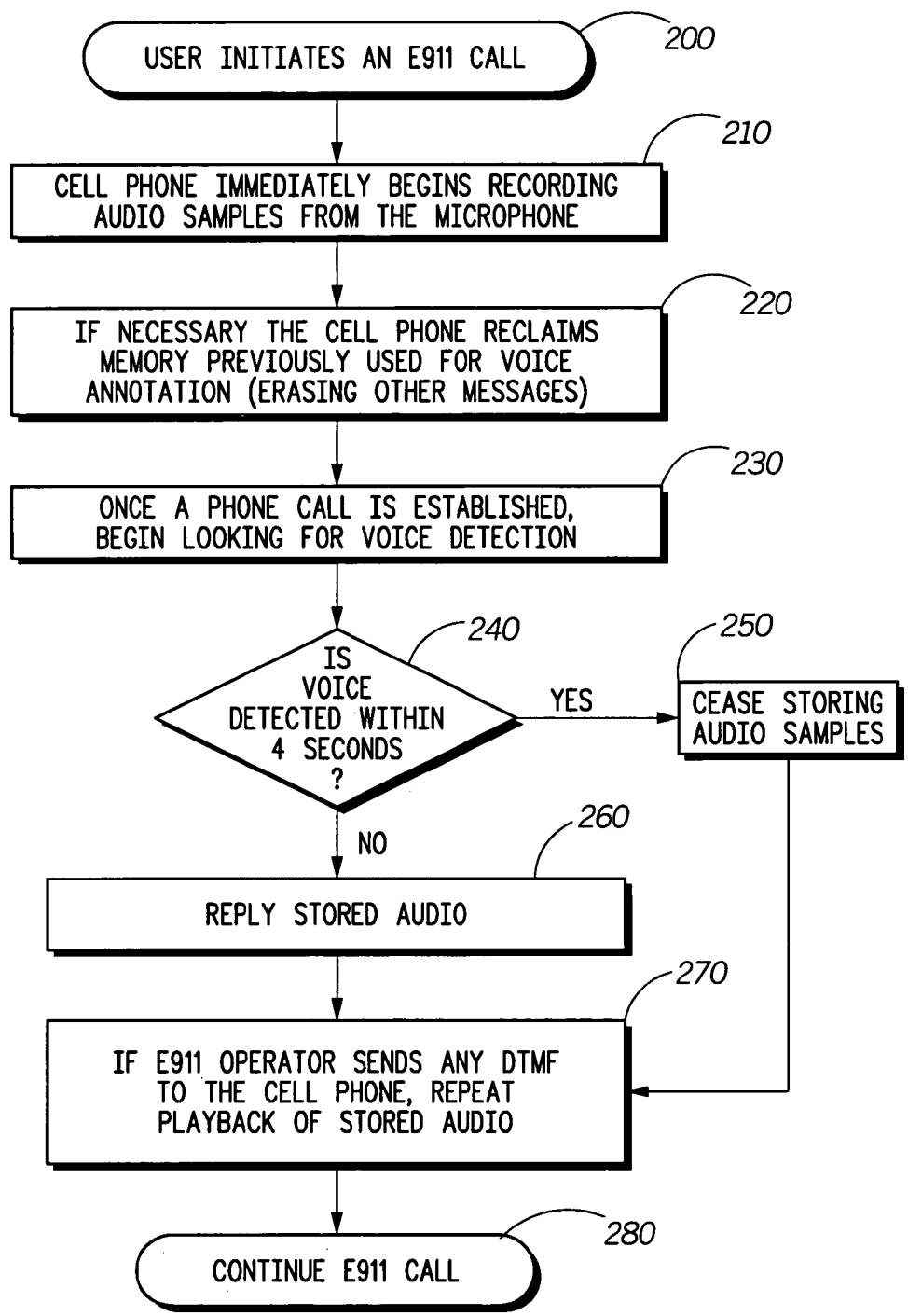
FIG. 3 is an operational flowchart for an alternate method of practicing the present invention.

It is recognized that in an emergency situation, it is likely that the wireless device user will immediately begin appealing for assistance after the E911 key is depressed, even if the E911 call has not yet been established. Thus, with reference now to FIG. 3, a second routine for playing back a stored audio message during an emergency situation is shown.

The emergency telephone call procedure is initiated by depressing a dedicated or conventionally pre-programmed turbo or speed-dial 911 key associated with the keypad 20 (step 200). Thereafter, the analog-to-digital (A/D) converter 28 immediately begins to sample and convert analog audio signals from the microphone transducer 22 into binary data for input into the controller 16 (step 210). As previously mentioned, the controller 16 executes a Vocoder algorithm to compress the binary voice data prior to being stored in the memory 18. If necessary, the controller 16 reclaims memory that was previously used for voice annotation by erasing other messages to make room for storing audio signals presently received from the microphone 22 (step 220).

The wireless device 10 initiates the E911 call in the same manner as a conventional speed-dialed call. That is, the controller 16 executes a routine that automatically dials a pre-stored telephone number (e.g. 911) that is assigned to the depressed key. Also, the controller 16 prompts the geolocation receiver 24 to resolve or otherwise lock on to received GPS signals to generate position data that is transmitted to the E911 call center across the uplink channel through transceiver 12.

The controller 16 initiates a timer routine when the wireless device 10 detects an "off-hook" signal condition on the downlink channel (i.e. an E911 operator has answered the emergency call)(step 230). In the embodiment being described, the timer routine is set to time out after (x) seconds, where (x) is in the range of about two seconds to about six seconds and preferably about four seconds. While the timer routine is executing, the controller 16 samples the uplink channel to determine whether the user is presently speaking into the microphone 22 (step 240). In particular, the controller 16 samples the voice detection section of a Vocoder chip/Vocoder algorithm to detect if the user's voice is presently being picked-up by the microphone 22.

If the user's voice is detected at the microphone before the timer routine times out, then the sampling and storage of the user's voice message in memory 18 is stopped (step 250). Otherwise, if the timer routine times out without detecting the user's voice (i.e. the user is incapacitated or is otherwise unable to speak), then the stored audio message is accessed from memory 18 and transmitted across the uplink channel through the transceiver 12 under the direction of the controller 16 (step 260). If the E911 operator desires to have the stored audio message replayed, the E911 operator simply depresses any one of the operator's keypad keys to generate a DTMF signal on the down link (step 270). When the wireless device 10 detects the DTMF signal, the stored audio message is played back through the transceiver 12 under the direction of the controller 16. Thereafter, the emergency call proceeds (step 280).

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

For instance, both of the above described operational flowcharts can be combined in such a manner that the wireless device can pass on a prerecorded message, then append any voice or sounds that occur after the E911 call is initiated.

It is also expected that the pre-stored message can be added to any audio signals present on the microphone and transmitted on the uplink channel. This method of combining audio signal is well known in telephony as "sidetone". Side tone refers to adding the user's voice signal to the received signal and applying both to the speaker thus allowing the user to hear his own voice.

It is also expected that messages other than audio could be stored. For example a text message or a data message could be stored (such as being uploaded into the memory 18 of the wireless device from a laptop, desktop, PDA, etc.) and later sent to an E911 operator in the methods described previously. The data message could be an electronic document, such as a living will, and may include an electronic signature. If the wireless device is equipped with a camera, the message transferred may include images. The data message can also be a text-to-speech file (synthesized audio message) that is uploaded into the memory 18.

It is further expected that the stored data message could be used for multiple purposes. The radio repertoire is the user information that is stored in the phone and may include such information as: Last Number Dialed; User Name and Address; and stored Names and Phone Numbers. Items from the repertoire (such as home phone number, or next of kin name and number) could be passed to the E911 operator during an emergency call.

We claim:

1. A method for sending a message stored in memory associated with the wireless device, comprising:
   a) initiating a call from the wireless device;
   b) initiating a timer when the call is established; and
   c) sending the stored message from the wireless device during the call, when a predetermined time has elapsed on the timer from when the call was established.

2. The method of claim 1, further comprising:
   d) sending position data from the wireless device when the call is established.

3. The method of claim 1, further including terminating sending the stored message when a key of the wireless device is activated.

4. A method of sending a message stored in memory associated with a wireless device, the wireless device including a microphone, the method comprising the steps of:
   a) initiating a call from the wireless device;
   b) monitoring the microphone for audio signals; and c) sending the stored message from the wireless device after a call is established if audio signals have not been detected being picked-up by the microphone of the wireless device; and d) never sending the stored message from the wireless device in connection with the call initiated from the wireless device, if audio signals have been detected being picked-up by the microphone of the wireless device.

5. A method of sending a message stored in memory associated with a wireless device, the wireless device including a microphone, the method comprising the steps of:
a) initiating a call from the wireless device;
b) monitoring the microphone for audio signals;
c) sending the stored message from the wireless device after a call is established; and
d) adding audio signals picked-up by the microphone of the wireless device into the stored message and sending the resultant combined signal.

6. The method of claim 5, and further including the step of storing an audio message picked-up from a microphone of the wireless device in a memory associated with the wireless device after initiating the call.

7. The method of claim 5, further including the step of storing a data message in a memory associated with the wireless device.

8. The method of claim 7, wherein the data message is part of a radio repertoire.

9. A method of sending a message stored in memory associated with a wireless device, the wireless device including a microphone, the method comprising the steps of:
a) initiating a call from the wireless device to a base;
b) sending the stored message from the wireless device to the base after a call is established;
c) detecting a playback command received from the base, in response to the operator of the base depressing a keypad key; and
d) resending the stored message from the wireless device responsive to detecting the command received from the base.

10. The method of claim 9, wherein step a) comprises detecting actuation of a speed-dial key and initiating the call from the wireless device in response to detecting actuation of the speed-dial key.

11. A method of sending a message stored in memory associated with a wireless device, the wireless device including a microphone, the method comprising the steps of:
a) initiating a call from the wireless device;
b) monitoring the microphone for audio signals;
c) sending the stored message from the wireless device after a call is established; and
d) terminating sending the stored message without resuming during the call initiated from the wireless device, when an audio signal is picked-up by a microphone of the wireless device.

12. A method for sending a message from a wireless device, including a microphone, the method comprising the steps of:
a) initiating a call from the wireless device;
b) storing audio detected by the microphone upon initiating the call in a memory associated with the wireless device; and
c) upon establishing the call, sending the audio that was stored upon initiating the call.

13. The method of claim 12, further comprising:
d) sending position data from the wireless device once the call is established.

14. The method of claim 12, wherein step c) comprises the step of:
d) sending the stored message if voice signals are not detected via the microphone of the wireless device within a predetermined time after the call is established.

15. The method of claim 12, wherein step c) comprises the step of:
d) terminating sending the stored message if audio signals are detected via the microphone of the wireless device.

16. The method of claim 12, wherein step c) comprises the step of:
d) terminating sending the stored message when a key of the wireless device is activated.

17. The method of claim 12, further comprising:
d) resending the stored message from the wireless device when a command is detected on a downlink channel.

18. The method of claim 12, wherein step a) comprises the step of:
d) initiating a call from the wireless device by depressing a speed-dial key.

19. The method of claim 12, wherein step b) comprises the step of:
d) storing the message picked-up from a microphone of the wireless device in a memory associated with the wireless device.

20. The method of claim 12, wherein step b) comprises the step of:
d) if necessary, reallocating the memory to store the message.

21. A wireless device comprising:
a keypad;
a transceiver;
a memory, a message stored in the memory; and
a controller programmed to:
a) initiate a call from the wireless device in response to a predetermined key stroke;
b) transmit the stored message through the transceiver to a base when the call is established; and
c) retransmit the stored message through the transceiver when a playback command is received from a base through the transceiver, in response to an operator of the base depressing a keypad key.

22. The wireless device of claim 21, further comprising:
a geolocation receiver for determining position data for the device; and
the controller further programmed to:
d) transmit the position data through the transceiver when the call is established.

23. A wireless device comprising:
a keypad;
a transceiver;
a memory, a message stored in the memory; and
a controller programmed to:
a) initiate a call from the wireless device in response to a key stroke;
b) initiate a timer when the call is established; and
c) transmit the stored message through the transceiver during the call after a predetermined time has elapsed on the timer from when the call was established.

24. The wireless device of claim 23 wherein the controller is further programmed to:
d) terminate transmission of the stored message when a voice signal is picked-up by a microphone of the wireless device.

25. The wireless device of claim 23 wherein the controller is further programmed to:

d) terminate transmission of the stored message when a key of the wireless device is activated.

26. A wireless device comprising:
a keypad;
a transceiver;
a memory, a message stored in the memory; and
a controller programmed to:
   a) initiate a call from the wireless device in response to a key stroke;
   b) storing audio picked up by a microphone after initiating the call;
   c) transmit the stored message through the transceiver to a base when the call is established; and
   d) reallocate memory to store the audio picked up by the microphone after initiating the call.

27. A wireless device comprising:
a keypad;
a transducer;
a transceiver;
a memory, the memory storing a message; and
a controller programmed to:
   a) initiate a call from the wireless device in response to a key stroke; and
   b) combine the stored message with an audio signal from the transducer and transmit the combined signal simultaneously through the transceiver when the call is established.

\* \* \* \* \*